No. 622,970. Patented Apr. 11, 1899.
A. S. McDONALD.
POTATO DIGGER AND SORTER.
(Application filed Dec. 9, 1898.)
(No Model.)
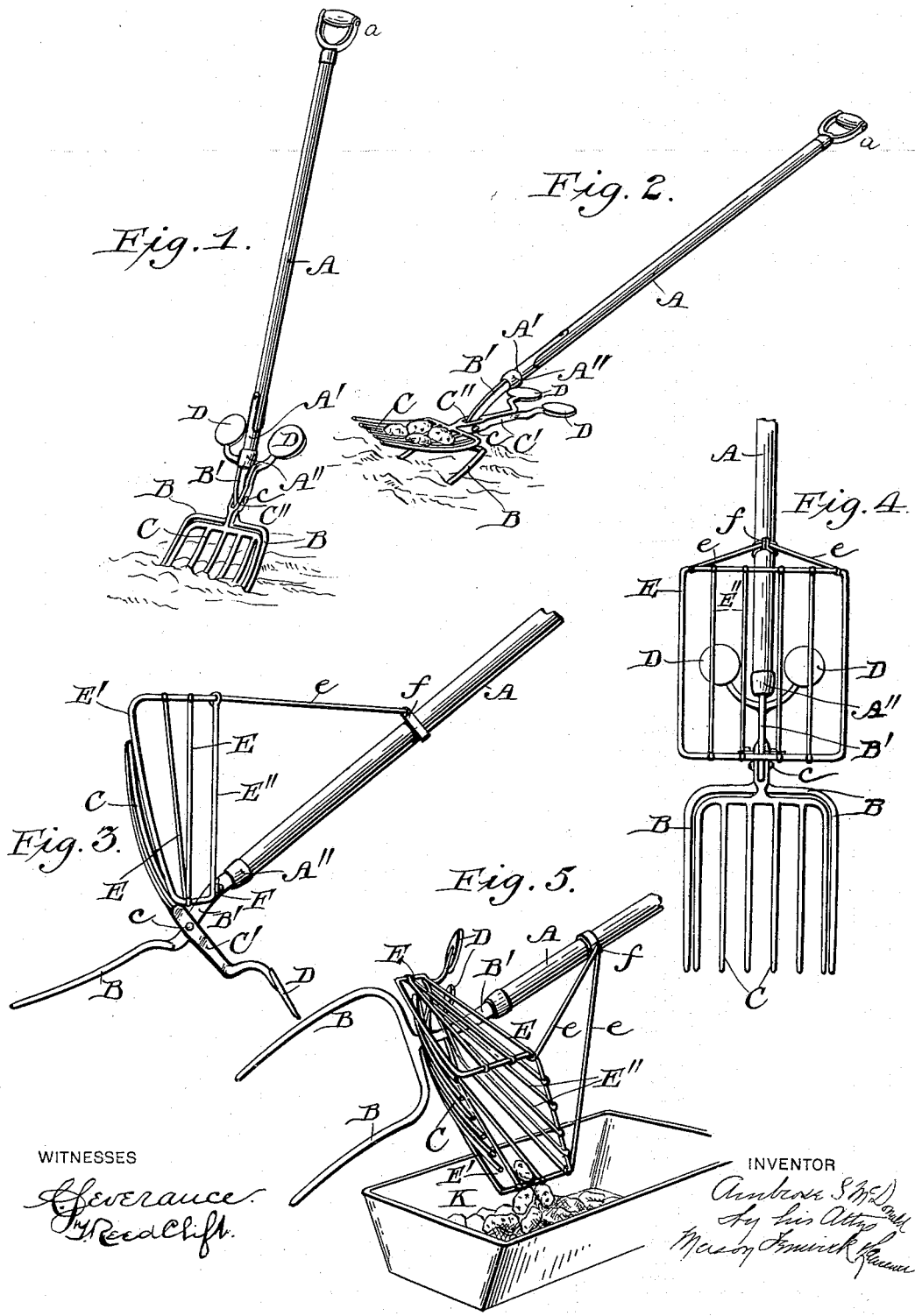

UNITED STATES PATENT OFFICE.

AMBROSE S. McDONALD, OF MARION, WISCONSIN.

POTATO DIGGER AND SORTER.

SPECIFICATION forming part of Letters Patent No. 622,970, dated April 11, 1899.

Application filed December 9, 1898. Serial No. 698,734. (No model.)

*To all whom it may concern:*

Be it known that I, AMBROSE S. MCDONALD, a citizen of the United States, residing at Marion, in the county of Waupaca and State of Wisconsin, have invented new and useful Improvements in Potato Diggers and Sorters, of which the following is a specification.

My invention relates to hand potato-diggers in which forks are used; and the main objects thereof are to raise the potatoes from the ground, sort them, and drop them into a receptacle.

The invention consists essentially, first, of a rigid fork attached to the handle; second, a revoluble pedal-actuated fork rocking upon the rigid or stationary fork and adapted to be pressed into the ground and raised therefrom with the potatoes by downward pressure upon the pedal, and, third, a basket arranged above the forks and adapted to receive the potatoes from the revoluble fork.

In the accompanying drawings, Figure 1 is a perspective view of my improved potato-digger with basket removed, showing the manner of first entering the ground. Fig. 2 is a perspective view of the same, showing the potatoes raised from the ground. Fig. 3 is a side view, and Fig. 4 a front view, of the invention with the basket adjusted; and Fig. 5 illustrates the manner of emptying the basket into any suitable receptacle.

Similar letters refer to similar parts in each view.

A represents the staff, upon the upper end of which a handle $a$ may be formed or attached.

B is a rigid or stationary fork, which is preferably two-tined and attached to the staff A in the usual and ordinary manner by passage of the shank B' into a socket A' in the lower end of handle A and being secured by a ferrule A''.

C is the revoluble fork, which I have shown having six tines and provided with a shank C', which surrounds the rigid fork at C''. I have shown the shank B' of the rigid fork passing through an eye C'' in the revoluble fork, being pivotally connected by means of a rivet or bolt $c$. It is obvious, however, that the position may be reversed and the shank C' of the revoluble fork be permitted to pass through an eye in shank B' of the stationary fork and be pivotally connected in a similar manner.

D D is a double pedal integral with the upper end of the shank C', one of the foot-plates being each side of the staff A to adapt it to either the right or left foot of the operator.

E represents the basket, which is constructed of upright rods with spaces between, the spaces being wider than the spaces between the tines of the fork C. The rods are joined to a circular wire at the top, and the basket is so constructed as to be open at the front end E' and closed at the rear end E'', the sides being arranged outside of the fork C.

The bottom of the basket is rigidly clipped by means of an ordinary clip F to the shank B' of the rigid fork, and the top is supported by means of the braces $e$ $e$, connected with the staff at $f$.

In its operation the digger is placed nearly perpendicular and forced into the ground by foot-pressure upon the top of the stationary fork, the handle being supported by the opposite hand of the operator, as shown in Fig. 1. Then the handle is pushed slightly downward to loosen the soil, and while being held in such position the foot is changed to the pedal D, pressing it downward to raise the opposite end of the revoluble fork, which raises the potatoes from the ground through the dirt, the potatoes being supported by the tines of the fork. When the pedal is forced down to the ground, as shown in Fig. 3, the fork will incline downwardly and the potatoes roll through the open end E' into the basket E, the smaller potatoes passing between the upright rods of the basket back upon the ground and the larger potatoes being sorted out and retained within the basket. Then by turning the basket sidewise, as shown in Fig. 5, the operator dumps the larger potatoes into the receptacle K, which is usually a basket or a box having low sides and is pushed or carried along by a boy as helper. When the pedal is released, the fork C drops to its original position by gravitation.

It will be observed that the tines of the fork C are closer together than the rods comprising the sides and rear end of the basket.

In its operation the fork C raises all the potatoes from the ground, and when they roll down the inclined fork against the sides and rear of the basket the smaller potatoes pass between the rods of the basket and drop to the ground below and the larger ones remain within the basket, thus sorting the potatoes. The smaller potatoes will remain upon the ground in rows and may be afterward picked up by hand or otherwise. This sorting feature of my invention is very valuable because the larger potatoes are usually sold in general markets and the smaller potatoes are sold at a less price to starch-factories for the manufacture of potato-starch.

My invention is adapted to be used either with or without the sorting-basket. The basket may be easily removed by unscrewing the clip F at the bottom and detaching the braces e e from the handle.

Having now described my invention, what I claim as new, and desire to secure by Letters Patent, is—

1. The combination with the staff and handle, of a stationary fork rigidly attached to the handle, a potato-lifting fork pivotally mounted on the shank of the stationary fork and having a pedal extending rearward, a basket attached above both forks open at the front to receive the potatoes from the lifting-fork, substantially as described.

2. In a potato fork and sorter, the combination of a suitable staff or handle, a stationary fork, a rotatable lifting-fork provided with a pedal, a basket attached to the handle above the forks, said basket being open at front to receive the potatoes, the openings at the discharge end of the basket being of a size to retain the larger potatoes but permit the smaller ones to pass out, substantially as described.

In testimony whereof I have hereunto set my hand in the presence of two subscribing witnesses.

AMBROSE S. McDONALD.

Witnesses:
W. R. BINKELMAN,
E. J. MEYER.